Jan. 19, 1926.
C. J. RAMSBURG
1,570,184
METHOD AND APPARATUS FOR CONDITIONING AIR
Filed July 30, 1923   2 Sheets-Sheet 1
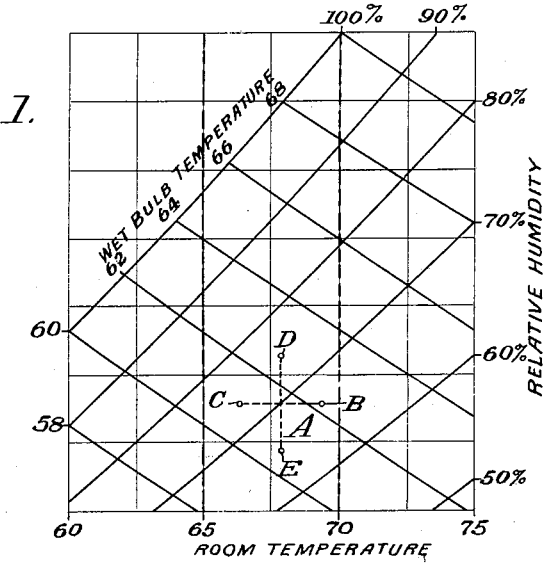
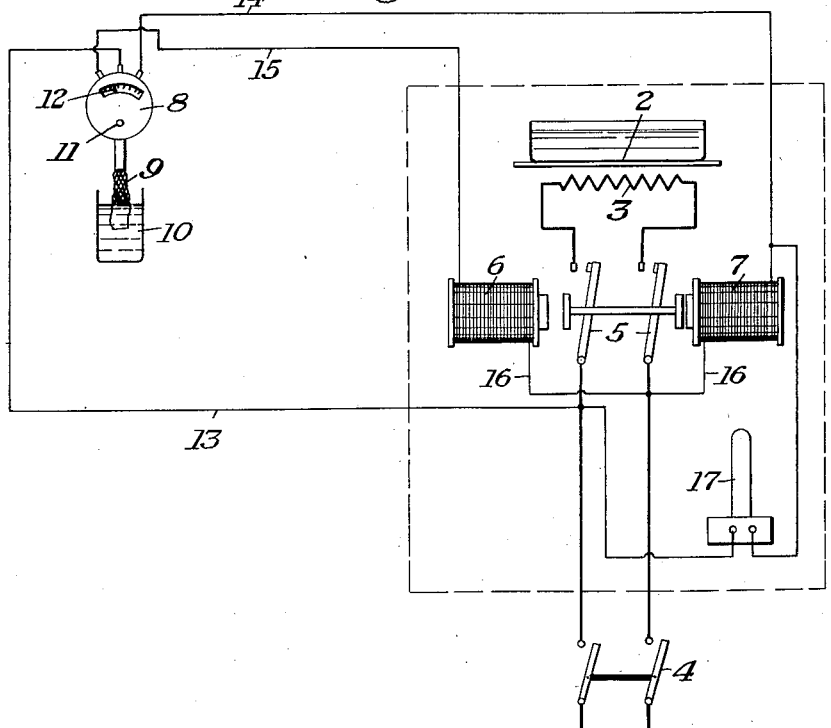
INVENTOR Jan. 19, 1926.  1,570,184
C. J. RAMSBURG
METHOD AND APPARATUS FOR CONDITIONING AIR
Filed July 30, 1923   2 Sheets-Sheet 2
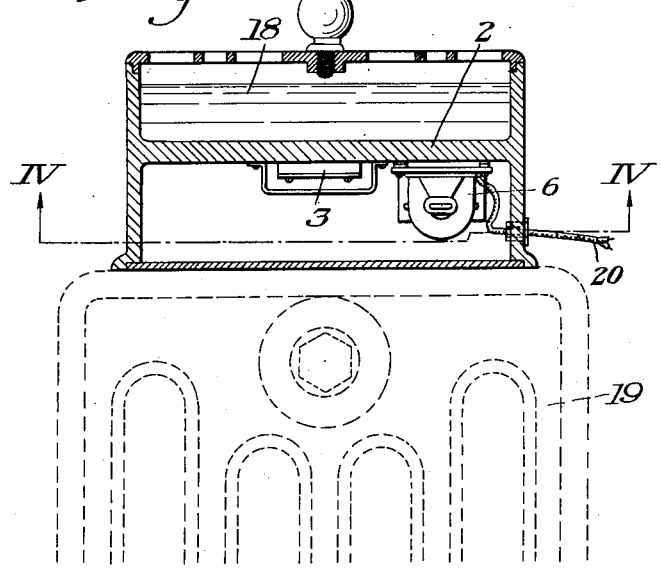
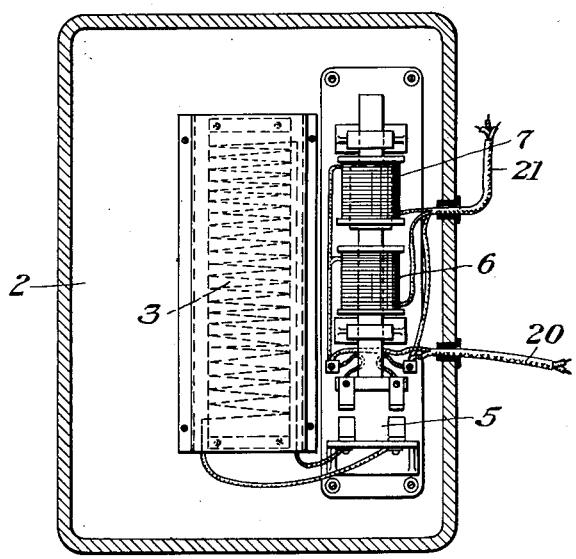

Patented Jan. 19, 1926.

1,570,184

UNITED STATES PATENT OFFICE.

CHARLES J. RAMSBURG, OF EDGEWORTH, PENNSYLVANIA.

METHOD AND APPARATUS FOR CONDITIONING AIR.

Application filed July 30, 1923. Serial No. 654,541.

*To all whom it may concern:*

Be it known that I, CHARLES J. RAMSBURG, a citizen of the United States, residing at Edgeworth, county of Allegheny, and State of Pennsylvania, have invented a new and useful Improvement in Methods and Apparatus for Conditioning Air, of which the following is a full, clear, and exact description.
This invention relates to method and apparatus for conditioning air and is particularly applicable to air conditioning in residences or the like.

I provide for conditioning air by controlling its moisture content solely by means responsive to the humidity of the air. I have found that in most residences and offices, particularly those equipped with thermostats, the room temperature is ordinarily confined within rather narrow limits—65° to 70° F. in the United States. Furthermore, some variation in the relative humidity is permissible without departing from proper room conditions.
I provide means for evaporating moisture into the air and controlling such evaporation by means responsive to the relative humidity of the air, as, for example, by an electric heater combined with a wet-bulb thermometer adapted to control the current flow to the heater. Such an installation may be made at a very reasonable cost, and the electrical energy required may be reduced to a minimum by placing the evaporator on a radiator or other air heating device and thus utilizing part of such heat to evaporate the water. The electrical energy is only required in that case to supply the additional heat necessary to properly control the rate of evaporation.

The wet-bulb thermostat used is preferably one which will close an electrical circuit when the temperature departs slightly from a predetermined figure in either direction. It can thus be utilized to open or close the heating circuit for intermittently evaporating water into the air.

In the accompanying drawing illustrating more or less diagrammatically one embodiment of the invention:

Figure 1 is a chart showing the relation between room temperature, wet-bulb temperature and relative humidity;

Figure 2 is a wiring diagram of the illustrated embodiment of the invention;

Figure 3 is a vertical section through an evaporator embodying the invention; and Figure 4 is a horizontal section on the line IV—IV of Figure 3.

As above stated, room temperatures in the United States generally lie between 65 and 70° F. or between heavy vertical dotted lines on the diagram of Figure 1. The relative humidity is preferably maintained in the neighborhood of 60 to 70 per cent. Assuming a room temperature of 68° and a relative humidity of 70 per cent, as indicated on the point A on the diagram, it will be seen that the corresponding wet-bulb temperature is approximately 61.5° F. If the room temperature is increased without a corresponding increase in the moisture content of the air, as indicated, for example, by a change to the condition of the point B, it will be seen that the wet-bulb temperature increases to approximately 62.5° F. If the temperature drops, as indicated by the point C, the corresponding wet-bulb temperature will be approximately 61° F. It will be obvious that a change in the moisture content without a change in the room temperature will also affect the wet-bulb temperature, as indicated, for example, by the points D and E.

I utilize these changes in the wet-bulb temperature to control an evaporator for supplying moisture to the room. Referring to Figure 2, there is shown in diagram an evaporator 2 provided with a heating coil 3 connected to line wires $L^1$ and $L^2$ through a main switch 4 and a magnetic switch 5. The magnetic switch 5 includes a pair of magnets 6 and 7 of which the magnet 7 is the stronger.

The current to the magnets 6 and 7 is controlled through a thermostat 8 of well-known construction having its temperature responsive element surrounded by a wick 9 dipping into a water vessel 10. A thumb nut 11 is provided for regulating the desired wet-bulb temperature, as indicated by a pointer on a scale 12. Such thermostats are well known and they are effective for closing their circuits on a temperature variation of 0.5° or less.

A wire 13 leads from the line wire $L^1$ to the thermostat 8 and a pair of wires 14 and 15 lead from the thermostat to the magnets 6 and 7, respectively, from which wires 16 are connected to the line L². If the wet-bulb temperature falls, current flows through the wires 13 and 15, energizing the magnet 6 and closing the switch 5. The closing of the switch 5 closes the circuit of the heating coil 3 and evaporates water into the air. As the moisture content increases, the wet-bulb temperature rises, current flows through the wires 13 and 14 to the magnet 7 and opens the switch 5, throwing the heater out of operation.

The frequency of this alternate turning off and on of the heater 3 is, of course, determined by the delicacy of adjustment of the thermostat 8. I have found in practice that the heater is in operation about half the time and requires very little current. It will be seen that the relative humidity may by confined within comparatively narrow limits with extremely simple apparatus.

To avoid the possibility of the apparatus operating continuously if the house is vacated without opening the switch 4, a thermostat 17 connected to the magnet 7 may be provided if desired. As above stated, the magnet 7 is stronger than the magnet 6 and the heater would be cut out of operation regardless of the influence of the wet-bulb thermostat 8.

The diagrammatic structure of Figure 2 is shown embodied in an evaporator in Figures 3 and 4, wherein the evaporator 2 takes the form of a water vessel 18 adapted to be set on a radiator 19 if desired. The heating coil 3, the switch 5 and the magnets 6 and 7 are supported inside the evaporator with an electric connection 20 to the line wires L¹ and L² and a connection 21 to the wet-bulb thermostat 8, which is preferably separated from the evaporator and set at some convenient point in the room. When the device is placed on a radiator, as shown, a certain amount of water is evaporated, depending on the amount of heat supplied to the room. Additional heat is supplied at intervals by the heater 3 and this additional heat is controlled by the wet-bulb thermostat 8. It will be seen that the relative humidity may be varied as desired by adjusting the thumb nut 11.

I provide for conditioning air by controlling the moisture content solely by means responsive to the relative humidity of the air. I further provide for supplying heat to the air, utilizing a portion of such heat to evaporate water into the air and intermittently supplying heat to the water. The apparatus is exceedingly simple and is particularly desirable for use in residences and the like. The current consumption is extremely low, particularly when the apparatus is used in connection with the room heating system, and it is effective for maintaining the relative humidity within desired limits.

While I have illustrated one embodiment of the invention, it will be understood that it is not limited thereto, but may be otherwise embodied within the scope of the following claims.

I claim:

1. Apparatus for conditioning the air in a room, including a radiator for heating the air in the room, a water-containing vessel adjacent thereto adapted to take heat from the radiator for evaporating the water into the air, an electric heater for supplying additional heat to the water-containing vessel, a switch for controlling the current supplied to the heater, and a wet-bulb thermostat remote from the radiator and effective for operating the switch to maintain the wet-bulb temperature between predetermined limits, substantially as described.

2. The method of conditioning air in a room which includes substantially continuously heating the air and also substantially continuously heating a body of water in a container in the room, the container being heated to above room temperature, such heat being effective for evaporating water into the room at a substantially constant rate, and intermittently supplying additional heat to the water, substantially as described.

3. The method of conditioning air in a room which includes substantially continuously heating the air and also substantially continuously heating a body of water in a container in the room, the container being heated to above room temperature, such heat being effective for evaporating water into the room at a substantially constant rate, and intermittently evaporating additional water into the air, substantially as described.

4. The method of conditioning air in a room which includes substantially continuously heating the air and also substantially continuously heating a body of water in a container in the room, the container being heated to above room temperature, such heat being effective for evaporating water into the room at a substantially constant rate, intermittently evaporating additional water into the air, and controlling such intermittent evaporation solely by means responsive to the wet-bulb temperature of the air, substantially as described.

5. Apparatus for conditioning air in a room including a room heater, an evaporator mounted thereon and adapted to receive heat therefrom, and means controlled by the humidity of the air for intermittently supplying additional heat thereto, substantially as described.

6. Apparatus for conditioning air in a room including a room heater, an evaporator mounted thereon and adapted to be heated thereby, means for supplying additional heat to the evaporator, and means controlled solely by the wet-bulb temperature of the air for regulating the additional heat supply means, substantially as described.

7. Apparatus for conditioning air in a room including a heater for the room, an evaporator mounted thereon and adapted to receive heat therefrom, and electrical means controlled by the wet-bulb temperature of the air for intermittently supplying additional heat to the evaporator, substantially as described.

In testimony whereof I have hereunto set my hand.

CHARLES J. RAMSBURG.